June 7, 1966 M. J. MORLEY ET AL 3,254,564
MAGNETIC GRADIENT PARTICLE ACCELERATOR
Filed Dec. 4, 1963 3 Sheets-Sheet 1

INVENTOR.
MORGAN J. MORLEY
DAVID I. GILBERT
BY Edward O. Ansell
Thomas H. Jones
ATTORNEYS June 7, 1966 M. J. MORLEY ETAL 3,254,564
MAGNETIC GRADIENT PARTICLE ACCELERATOR
Filed Dec. 4, 1963 3 Sheets-Sheet 2

INVENTOR.
MORGAN J. MORLEY
DAVID I. GILBERT
BY
ATTORNEYS

June 7, 1966 M. J. MORLEY ETAL 3,254,564
MAGNETIC GRADIENT PARTICLE ACCELERATOR
Filed Dec 4, 1963 3 Sheets-Sheet 3

INVENTORS
MORGAN J. MORLEY
DAVID I. GILBERT
BY Edward O. Ansell
Thomas K. Jones
ATTORNEYS United States Patent Office 3,254,564
Patented June 7, 1966

3,254,564
MAGNETIC GRADIENT PARTICLE
ACCELERATOR
Morgan J. Morley, Berkeley, and David I. Gilbert, Walnut Creek, Calif., assignors to Aerojet-General Nucleonics, San Ramon, Calif., a corporation of California
Filed Dec. 4, 1963, Ser. No. 328,025
9 Claims. (Cl. 89—8)

This invention relates to particle accelerators generally and more particularly to particle accelerators employing a magnetic field gradient.

Those concerned with research on the hypervelocity impact of micrometerorites have long recognized the need for a device to accelerate small particles, in the size range of 100–1000 microns, to velocities of 20 km./sec. and higher. Light gas guns, using gases such as hydrogen at high sonic speeds, are only capable of producing velocities up to 8–10 km./sec. for the particle size range of interest. Present particle accelerators, using either shaped explosive charges or exploding films are likewise limited to velocities up to 10 km./sec. The shaped charges or exploding films use the direct force of the explosion for acceleration.

It is therefore the principal object of this invention to provide a novel method of and improved means for accelerating small particles to extremely high velocities.

Another object of this invention is to provide a novel particle accelerator employing a magnetic field gradient to accelerate small metallic particles.

Still another object of this invention is to provide a novel particle accelerator to accelerate 100–1000 micron particles to velocities of 20 km./sec. or higher.

The basic magnetic gradient particle accelerator, as described in our co-pending divisional patent application, Serial No. 505,300, filed September 21, 1965, comprises a metallic particle around which there is arranged a cylindrical conductor, a ring of high energy explosive, and an inductor. The inductor, adapted for series connection to a power source, establishes a large axial magnetic field in the space around the metallic particle. Detonation of the high energy explosive at one end causes the cylindrical conductor to implode as a cone, thus increasing the magnetic field around the metallic particle and creating a convergence of the magnetic field with a resultant large magnetic gradient. The radial component of the magnetic gradient or pressure from the converged field exerts a large accelerating force on the particle and propels it from the device. The constraining magnetic pressure exerted by the implosion assists in preventing any particle deformation. In this manner, it is possible to achieve particle velocities abov 20 km./sec.

In the present invention, the metallic particle is placed within a shaped flux concentrator within the cylindrical conductor. This permits the use of a shaped particle and eliminates the requirement that the conductor implode as a cone. The convergence of the magnetic field is achieved by the inner surface of the flux concentrator and is not dependent on the shape of the imploding conductor.

These and other objects, advantages, and features of the present invention will be apparent to those skilled in the art from the following description taken together with the appended drawings, wherein, FIG. 1 is a diagrammatic cross-sectional view of the novel particle accelerator of the present invention, FIG. 2 is an enlarged cross-sectional view of the flux concentrator of FIG. 1 taken along line 2—2 of FIG. 3, FIG. 3 is a cross-sectional view of the flux concentrator taken along line 3—3 of FIG. 2.

Figure 1:
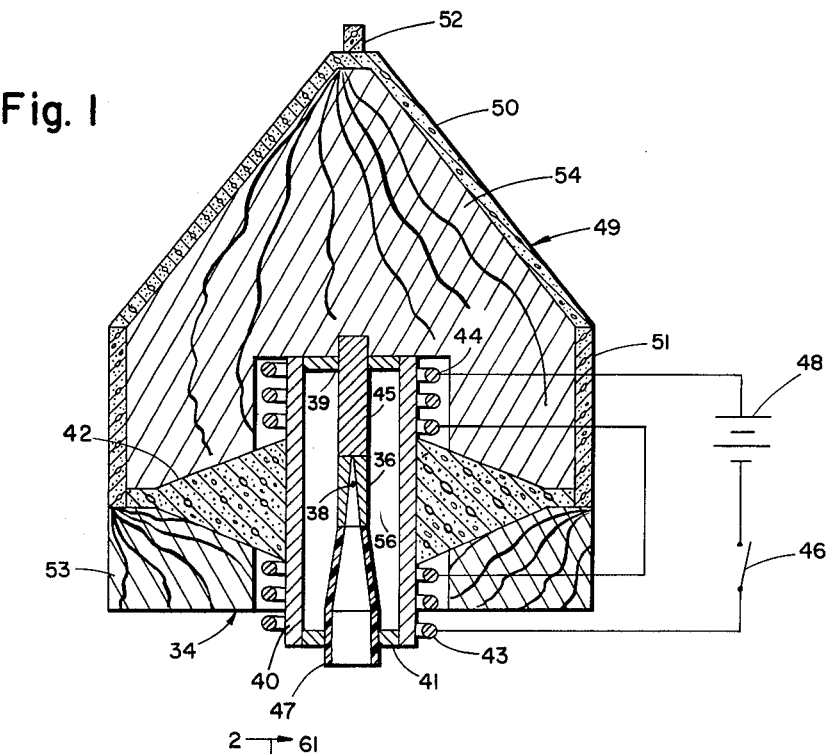

Referring now to FIG. 1, there is shown the basic particle accelerator, 34, of the present invention. A metallic particle, 38, of an electrically conductive material, is held within a flux concentrator, 36, within a hollow cylinder of a diamagnetic material, hereinafter referred to as the conductor or the armature 40. The armature, 40, is provided with an upper end plate, 39, and lower end plate, 41. A support rod, 45, attached to the upper end plate, 39, supports the flux concentrator, 36, on the axis of the armature, 40. A hollow muzzle, 47, of a material such as a synthetic phenol formaldehyde resin, e.g., Micarta, extends from the flux concentrator, 36, through the lower end plate, 41.

A ring, 42, of high energy explosive, such as TNT (trinitrotoluene) or RDX (cyclotrimethylene trinitramine) or mixtures thereof, is concentrically arranged about the central section of the armature, 40. This ring, 42, can be of decreasing thickness with increasing diameter. Concentrically arranged about the ends of the armature, 40, is a lower inductor, 43, and an upper inductor, 44. These inductors, 43 and 44, are connected in electrical series to each other and externally to a power source, 48, and starting switch, 46. A wave generator, 49, is situated at the upper end of the accelerator, 34. This wave generator, 49, comprises a hollow conical upper section, 50, and a hollow cylindrical section, 51, both of high energy explosive. A detonator, 52, is situated at the apex of the upper conical section, 50, while the lower section cylinder, 51, extends between the base of the cone, 50, and the outer edge of the ring, 42. A lower block, 53, of an inert material such as wood or polyurethane, supports the wave generator, 49, and ring, 42. A filler, 54, also of inert material, is located within the hollow cone, 50, and cylinder, 51, of the wave generator, 49.

The assembly of the accelerator is relatively simple, starting with the armature, 40, and its contents. The lower inductor, 43, and lower block, 53, are first put around the armature, 40. Then the ring, 42, and upper inductor, 44, are added. It is then a simple matter to place the wave generator, 49, over the assembly and complete the external electrical circuits.

Figure 3:
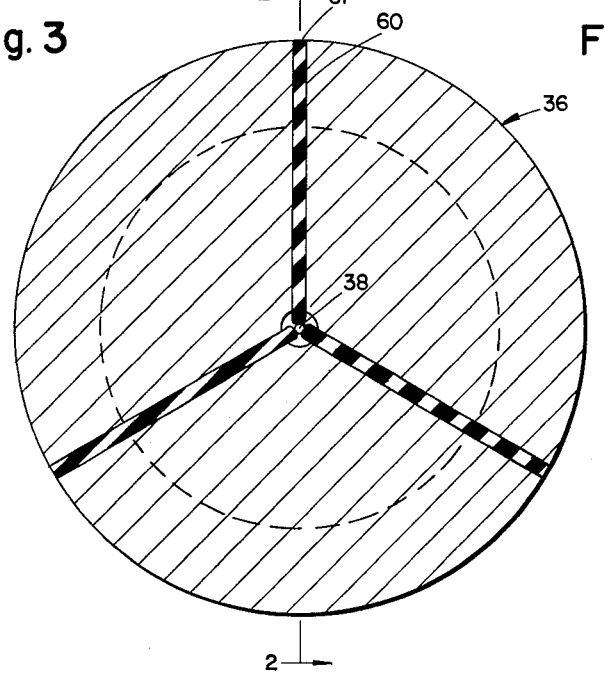
Figure 2:
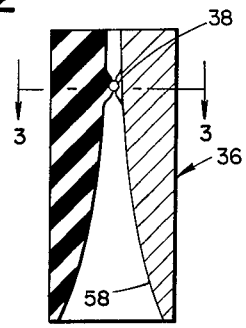

FIGS. 2 and 3 illustrate enlarged cross-sectional views of this flux concentrator, 36. It is important that the flux concentrator be constructed of a diamagnetic material; that is, having a relative magnetic permeability slightly less than unity. Most conductors, including copper, would be suitable. The inner surface, 58, of the flux concentrator, 36, is tapered, having a greater diameter at the bottom. A series of narrow, longitudinal slots, 60, extends the full height of the flux concentrator, 36, and divides the flux concentrator into separate sections. These slots, 60, are filled with an insulating material, 61, such as Teflon. At the upper end of the flux concentrator, 36, this insulating material extends around the particle, 38, and holds it in position prior to acceleration.

Thus when the starting switch, 46, is closed, connecting the power source, 48, to the inductors, 43, 44, a magnetic field is established in the space between the armature, 40, and flux concentrator, 36. The magnetic flux tends to be excluded by the flux concentrator material because of the magnetic properties of the material. The slots, 60, however, permit the entry of the magnetic flux into the interior cavity of the flux concentrator, 36. The inner surface, 58, of the flux concentrator, 36, contours the shape of the magnetic field. Detonation of the high energy explosive ring, 42, by means of the wave generator, 49, sets up an explosive force which will implode the central section of the armature, 40, around the flux concentrator, 36. This implosion will concentrate the magnetic field around the particle, 38, since the flux will tend to be excluded from the flux concentrator, 36, itself. The tapered inner surface, 58, of the flux concentrator, 36, shapes this rapidly rising magnetic field and establishes a magnetic gradient which acts upon the particle, 38, by exerting an extremely large accelerating force thereon. The particle will be accelerated the length of the concentrator and be ejected from the device through the muzzle, 47.

This invention eliminates the requirement that the armature implode as a cone in order to set up the magnetic gradient. The flux concentrator serves the function of shaping the field and setting up the gradient. Thus a simple implosion of the armature as a cylinder will suffice. In addition, the outside diameter of the flux concentrator firmly establishes the strength of the final magnetic field and convergence ratio of the imploding armature. Also, placing the inductors closer to the armature permits a higher initial magnetic field to be established.

Figure 4:
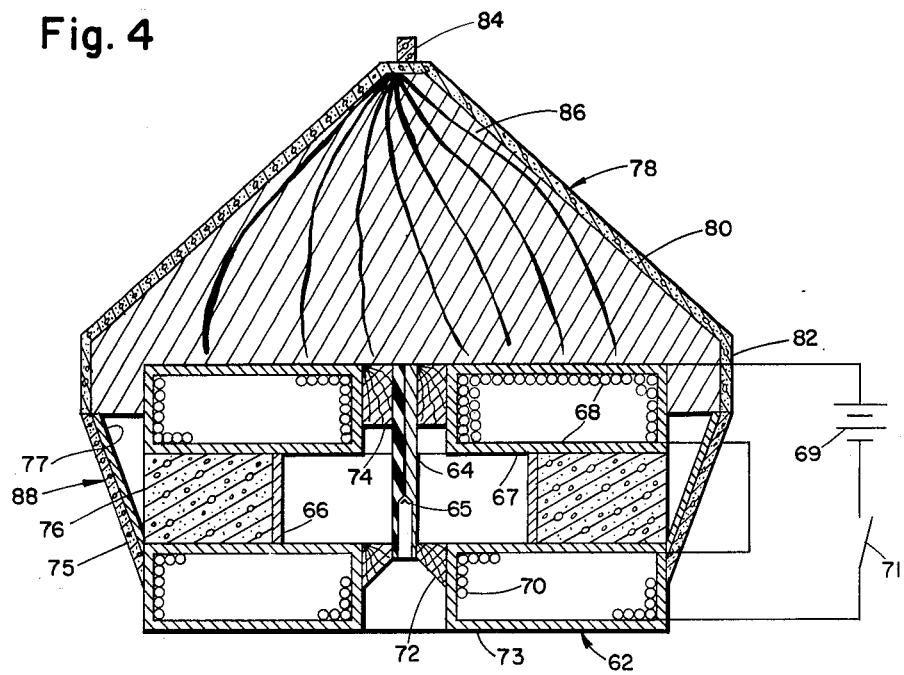
FIG. 4 is a diagrammatic cross-sectional view of a first alternate embodiment of the novel particle accelerator of the present invention.

FIG. 4 illustrates a first alternate embodiment, 62, of the novel particle accelerator. The flux concentrator, 64, containing the projectile, 65, is arranged on the axis of the armature, 66. At each end of the armature, 66, there are induction coils, an upper inductor, 68, and lower inductor, 70, respectively. The inductors, 68 and 70, are connected in electrical series to a power source, 69, and starting switch, 71. The lower end of the flux concentrator, 64, is supported within the lower inductor, 70, by means of a lower support, 72, of inert material such a wood or polyurethane. The upper end of the flux concentrator, 64, is supported within the upper inductor, 68, by means of an upper support, 74, likewise of inert material. Concentrically arranged around the armature, 66, and between the inductors, 68, 70, is a main charge, 76, a concentric ring of high energy explosive. A wave generator, 78, is placed atop the accelerator, 62, and comprises a hollow conical upper section, 80, and a hollow cylindrical section, 82, both of high energy explosive. A detonator, 84, is situated at the apex of the conical section, 80. A filler, 86, of inert material, occupies the hollow portions of the wave generator, 78. The cylindrical section, 82, of the wave generator, 78, connects to a flying plate assembly, 88, which is concentrically arranged around the main charge, 76. This assembly, 88, comprises a tapered ring, 75, of high energy explosive placed over a tapered metallic ring, 77. The assembly of this embodiment is accomplished in a manner similar to the assembly of the previously described device.

Figure 5:
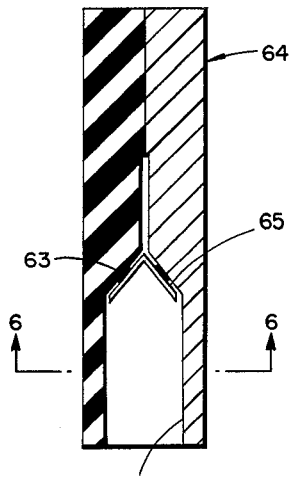
FIG. 5 is an enlarged cross-sectional view of the flux concentrator of FIG. 4 taken along line 5—5 of FIG. 6.
Figure 6:
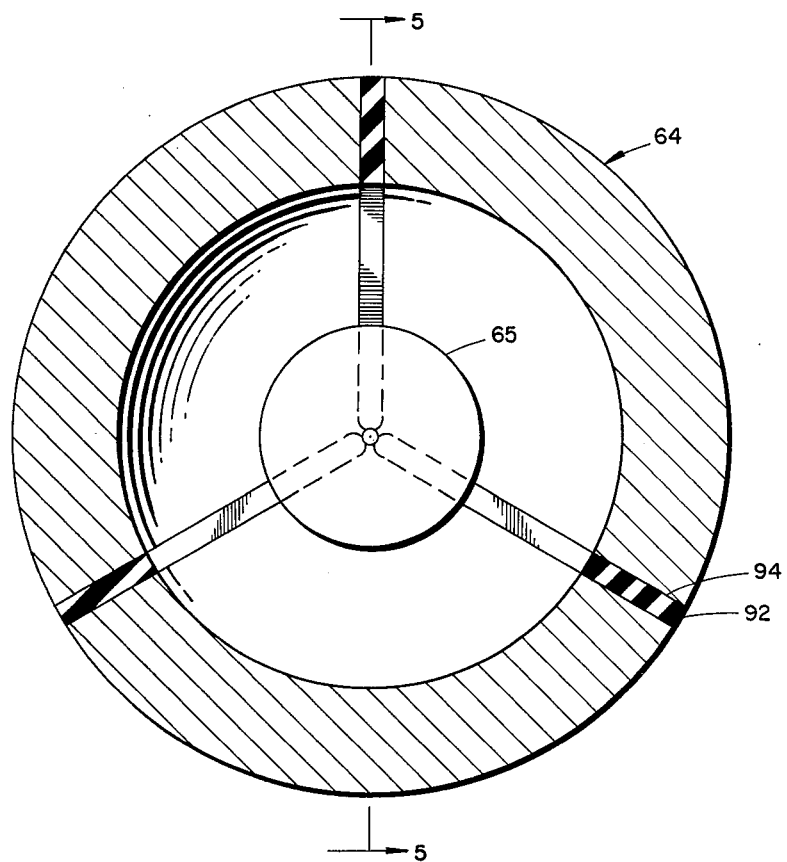
FIG. 6 is a cross-sectional view of the flux concentrator taken along line 6—6 of FIG. 5.

Again the power source, 69, is connected with the inductors, 68, 70, by closing the starting switch, 71, thereby establishing a magnetic field around the flux concentrator, 64. The flux concentrator, 64, shown in enlarged views in FIGS. 5 and 6 is of a diamagnetic material and tends to exlude the magnetic flux from itself. As in the previous device, the flux concentrator, 64, has slots, 92, filled with an insulating material 94, which permit the entry of the magnetic field into its interior. The inner surface, 90, of the flux concentrator, 64, is contoured to shape the magnetic field around the shaped projectile, 65. In the present instance, the projectile, 65, is shaped as a hollow cone with its apex extending upward. Thus the inner surface, 90, of the flux concentrator, 64, has a small diameter at its upper end and then tapers suddenly to a large diameter in the area of the projectile, 65. The projectile, 65, is held in position prior to acceleration by means of glue, 63, or another adhesive material. Detonation of the wave generator, 78, by means of the detonator, 84, sends a detonation wave through the wave generator, 78, to the flying plate assembly, 88, where the tapered explosive ring, 75, is detonated, thereby hurling the tapered metallic ring, 77, onto the main charge, 76. This "flying" tapered metallic ring, 77, simultaneously detonates the entire outer surface of the main charge, 76, which in turn implodes the armature around the flux concentrator, 64, with a high degree of cylindrical symmetry. This results in the concentration and convergence of the magnetic field around the projectile, 65, as in the previous described device and the acceleration and ejection of the projectile.

This embodiment brings the inductors still closer to the flux concentrator and also is easily adaptable to provide a vacuum around the projectile and flux concentrator. The vacuum greatly enhances the performance of the accelerator. To further increase performance, the inductors can be enclosed and fitted with tubing to provide cooling with cryogenic liquids. This permits an even greater magnetic field to be established.

While a number of details of construction and an alternate embodiment have been illustrated and described, alternatives and equivalents will occur to those skilled in the art which are within the spirit and scope of this invention. It is, therefore, desired that protection not be limited to the details illustrated and described, but only by the proper scope of the appended claims.

What is claimed is:

1. An improved particle accelerator comprising: a metallic particle, a hollow flux concentrator having a tapered inner surface adapted to contain said metallic particle, a hollow conductor concentrically arranged about said flux concentrator, a first inductor concentrically arranged about one end of said conductor, a second inductor concentrically arranged about the other end of said conductor, said inductors adapted to establish a magnetic field within said conductor and around said particle, and an explosive charge concentrically arranged about the central section of said conductor and between said inductors, said explosive charge adapted to implode said conductor upon said flux concentrator so as to converge the magnetic field and thereby accelerate said particle.

2. The improved particle accelerator described in claim 1 wherein said hollow flux concentrator is of a diamagnetic material and having a plurality of narrow longitudinal slots filled with an inert material.

3. The improved particle accelerator described in claim 1 and in addition a wave generator adapted to simultaneously detonate the outer surface of said explosive charge.

4. An improved particle accelerator comprising: a metallic projectile, a hollow flux concentrator having a tapered inner surface adapted to contain said metallic projectile, a first inductor concentrically arranged about one end of said flux concentrator, a second inductor concentrically arranged about the other end of said flux concentrator, said inductors adapted to establish a magnetic field around said metallic projectile, a hollow conductor concentrically arranged about said flux concentrator and between said inductors, and an explosive charge concentrically arranged about said conductor, said explosive charge adapted to implode said conductor upon said flux concentrator so as to converge the magnetic field and thereby accelerate said projectile.

5. The improved particle accelerator described in claim 4 and in addition a flying plate adapted to simultaneously detonate the outer surface of said explosive charge.

6. The improved particle accelerator described in claim 4 wherein the metallic projectile has the shape of a hollow cone.

7. An improved particle accelerator comprising: a metallic particle, a flux concentrator in which said metallic particle is disposed, a hollow conductor in which said flux concentrator is disposed, means arranged about said conductor for establishing a magnetic field within said conductor and around said particle, and an explosive charge arranged about said conductor so as to implode said conductor upon said flux concentrator when said explosive charge is detonated establishing a gradient in the magnetic field within said conductor and around said metallic particle whereby said metallic particle is accelerated.

8. An improved particle accelerator comprising: a metallic particle, a hollow flux concentrator in which said metallic particle is disposed, a hollow armature in which said hollow flux concentrator is disposed, at least one inductor arranged about said flux concentrator, said armature, and said particle therein, power means for providing electric energy to said inductor for establishing a magnetic field around said particle within said flux concentrator when said inductor is energized, an explosive charge arranged about said armature, and said armature being imploded about said flux concentrator in response to the detonation of said explosive charge for converging the magnetic field around said particle to produce a magnetic gradient causing said particle to be accelerated through said flux concentrator.

9. An improved particle accelerator comprising: a metallic particle, a hollow armature in which said metallic particle is disposed, at least one inductor arranged about said armature and said particle therein, power means for providing electric energy to said inductor for establishing a magnetic field around said particle within said armature when said inductor is energized, flux concentrator means having a tapered inner surface disposed between said hollow armature and said metallic particle and being constructed to admit magnetic flux into its interior so that the tapered inner surface can shape the magnetic field, an explosive charge arranged about said armature, and said armature being imploded about said flux concentrator means in response to the detonation of said explosive charge for converging the magnetic field around said particle to produce a magnetic gradient causing said particle to be accelerated through the armature.

References Cited by the Examiner

UNITED STATES PATENTS

| 2,604,042 | 7/1952 | Cook | 102 |
| 2,774,306 | 12/1956 | MacLeod | 102 |
| 2,870,675 | 1/1959 | Salisbury | 89—8 X |
| 3,113,272 | 12/1963 | Cannon et al. | 328—1 |
| 3,126,789 | 3/1964 | Meyer | 89—8 |
| 3,148,587 | 9/1964 | Melhart | 89—8 |

BENJAMIN A. BORCHELT, *Primary Examiner.*

S. W. ENGLE, *Assistant Examiner.*